United States Patent
Pidoux

(10) Patent No.: US 6,736,464 B1
(45) Date of Patent: May 18, 2004

(54) HUB FOR MOTORCYCLE OR THE LIKE PERMITTING RENDERING REVERSIBLE THE WHEEL IN ITS SUPPORT

(75) Inventor: Laurent Pidoux, Exincourt (FR)

(73) Assignee: AJP Industrial, Barcelona (ES)

( * ) Notice: Subject to any disclaimer, the term of this patent is extended or adjusted under 35 U.S.C. 154(b) by 0 days.

(21) Appl. No.: 09/889,923

(22) PCT Filed: Jan. 25, 2000

(86) PCT No.: PCT/FR00/00162

§ 371 (c)(1),
(2), (4) Date: Jul. 25, 2001

(87) PCT Pub. No.: WO00/43222

PCT Pub. Date: Jul. 27, 2000

(30) Foreign Application Priority Data

Jan. 25, 1999 (FR) .............................................. 99/00771

(51) Int. Cl.[7] .............................................. B60B 27/00
(52) U.S. Cl. ......................... 301/110.5; 301/6.9; 188/26
(58) Field of Search ................................ 301/59, 110.5, 301/110.6, 6.9; 188/26; 474/116

(56) References Cited

U.S. PATENT DOCUMENTS

| 3,062,329 A | * | 11/1962 | Erickson | |
|---|---|---|---|---|
| 4,062,427 A | * | 12/1977 | Klaue | 188/26 X |
| 4,170,369 A | * | 10/1979 | Strutman | 188/26 X |
| 4,343,380 A | | 8/1982 | Kawaguchi | |
| 4,508,392 A | * | 4/1985 | LeBlond et al. | |
| 4,810,039 A | * | 3/1989 | Trema | 301/110.5 X |
| 5,332,294 A | * | 7/1994 | Haeussinger | 301/110.5 |
| 5,372,407 A | * | 12/1994 | Brown et al. | 301/110.6 |
| 5,992,587 A | * | 11/1999 | Maldonado | 188/344 |
| 6,318,810 B1 | * | 11/2001 | Miyake et al. | 301/110.5 |

FOREIGN PATENT DOCUMENTS

| EP | 0 014 101 | | 8/1980 |
|---|---|---|---|
| FR | 2 752 773 | | 3/1998 |
| JP | 55-51601 | * | 4/1980 |
| JP | 61/81853 | * | 4/1986 |
| JP | 61-236935 | | 3/1987 |
| JP | 63-215401 | | 12/1988 |
| JP | 2-234801 | * | 9/1990 |
| JP | 05-221202 | | 12/1993 |

* cited by examiner

Primary Examiner—Russell D. Stormer
(74) Attorney, Agent, or Firm—Young & Thompson

(57) ABSTRACT

Rear wheel hub of a two-wheel vehicle, secured to a tooth transmission gear and a brake disc, is noteworthy in that it is arranged so as to have in each of its two possible positions of mounting 180° apart, a toothed gear (7; 14, 15) on the side where the chain is located and the brake disc (6, 14b, 15b) on the side where the disc brake is located; such a hub comprises three interconnected parts, namely a central core (3) symmetrical relative to a transverse medial plane (P), comprising on each of its two front surfaces (3a, 3b), a same number of interfitting connecting elements (11), male or female, distributed about the axis (x, y) of the hub, and flanges (4, 5) connected respectively to the two front surfaces (3a, 3b) of the hub, one carrying the disc brake (6) and the other the toothed transmission gear (7), each of these flanges (4, 5) comprising, on its surface (4b, 5b) turned toward the associated surface (3a, 3b) of the hub (3), complementary male or female elements (12) coacting with the elements (11) of the hub (3) to secure the hub in the two flanges (4, 5) together.

6 Claims, 1 Drawing Sheet

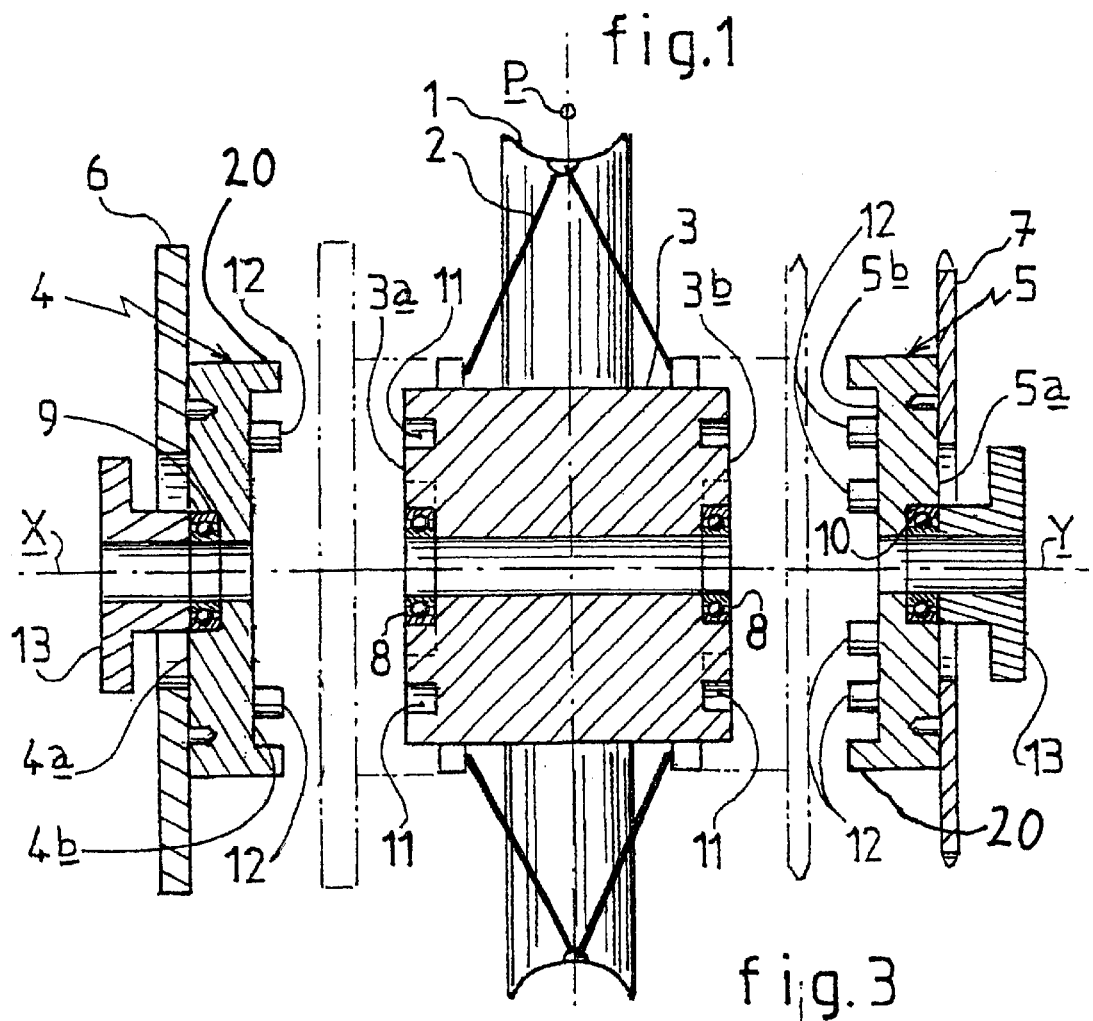
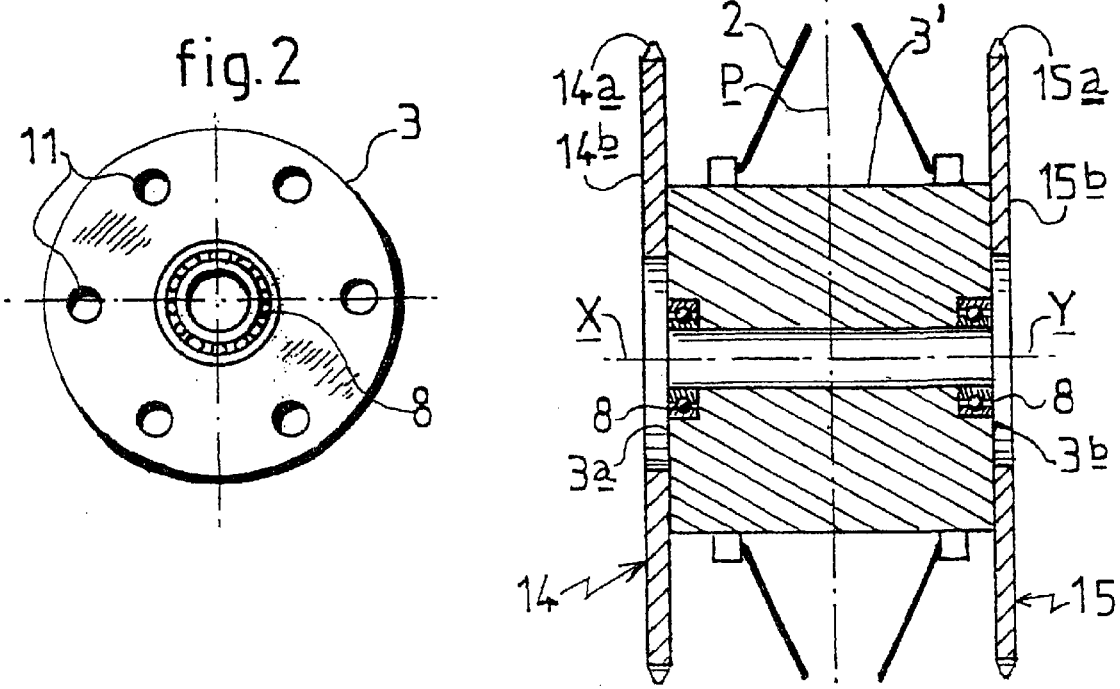

HUB FOR MOTORCYCLE OR THE LIKE PERMITTING RENDERING REVERSIBLE THE WHEEL IN ITS SUPPORT

BACKGROUND OF THE INVENTION

The present invention relates to a hub for the rear wheel of a two-wheel vehicle such as a motorcycle, a motor bike, a cycle, that permits reversing the wheel in its support.

Persons using motorcycles regularly reverse the tires of their rear wheel to improve the performance of their vehicle or for economy because of the deterioration of the attack edge of the contour of their tire in the direction of traction. It is thus noted that a rear tire always wears more quickly in the traction direction than in the braking direction. When substantial wear of the tire is noted, the user of the motorcycle reverses it to give better gripping traction because it will then be working in the reverse direction of its preceding wear. However, as the hub of a rear wheel comprises a toothed transmission gear for the movement of rotation, fixed on one side of the hub, and a brake disc fixed on the other side of the hub, the rear wheel must be always mounted in the same position, which is to say with the toothed gear of its hub located on the side of the motorcycle where the drive chain is located. As a result, when the user must reverse the rear tire, he is obliged, after having dismounted the rear wheel, to take the tire off the rim, reverse it, return it into its original position on the rim, and finally remount the wheel. All these operations obviously take a relatively long time.

To this end, there has already been proposed a solution in Japanese patent JP 05 221202 by turning the rear wheel on itself about its axis of vertical symmetry, whilst leaving in place the toothed gear by the transmission of movement from the side of the drive chain and the brake disc on the other side; to do this, it is provided according to this prior art document to dismount the two pieces prior to reversing the wheel on itself, by removing securement bolts that hold them to the central core of the wheel and, naturally, the opposite is done to remount the wheel.

These mounting/dismounting operations of the pieces on the core remain long, difficult and give only a small saving of the time of reversal of the wheel, particularly during competition.

The present invention seeks to overcome this drawback by providing a rear wheel having a hub of simple and reversible design, permitting reversing the rear tire without having to disengage it from the rim of the wheel.

To this end, this rear wheel of a two-wheel vehicle, comprising a hub, a toothed gear for the transmission of rotative movement and a brake disc, is characterized in that the hub is a monobloc assembly symmetrical relative to the transverse medial plane (P) or in three portions easily disassembleable by the nut of the wheel and connected to each other by means rendering them fixed in rotation, which assembly comprises means permitting it in one or the other of its two possible mounting positions opposite each other by 180° relative to each other, to have a toothed gear (7; 14, 15) on the side where the transmission chain is located and a brake disc (6, 14b, 15b) on the side where the disc brake is located.

According to one embodiment of the present invention, the hub comprises three parts secured to each other, namely a central hub symmetrical relative to a transverse medial plane, comprising on each of its two front surfaces, a same number of interfitting coupling elements, male or female, distributed in the same way about the axis of the hub, and flanges disposed respectively on the two front surfaces of the hub, one of which carries the brake disc and the other the toothed transmission gear, each of these flanges comprising, on its surface turned toward the associated frontal surface of the hub, complementary coupling elements, female or male, coacting with the coupling elements of the hub to render the hub secure in rotation between its two flanges.

According to a modified embodiment, the hub is symmetrical relative to a transverse medial plane and its two front surfaces are respectively secured to identical toothed transmission gears, the external surface of each toothed transmission gear serving also as the brake disc.

BRIEF DESCRIPTION OF THE DRAWINGS

There will be described hereafter various embodiments of the present invention with reference to the accompanying drawing, in which:

FIG. 1 is an exploded axial cross-sectional view of a rear wheel hub according to the invention, FIG. 2 is an elevational view of a front surface of the central core of the hub shown in FIG. 1, FIG. 3 is an axial cross-sectional view of a modified embodiment of the rear wheel hub according to the invention.

DETAILED DESCRIPTION OF THE PREFERRED EMBODIMENTS

In FIG. 1 is shown schematically a rear wheel of a two-wheel vehicle, such as a motorcycle, this wheel comprising a peripheral rim 1 connected by spokes 2 to the hub of the wheel. This hub is comprised, in this non-limiting embodiment, of three parts, namely a central cylindrical core 3, symmetrical relative to a transverse medial plane P of the wheel, and two side flanges 4 and 5 connected to the left 3a and right 3b front surfaces of the core 3. The left flange 4 constitutes a support for an angular brake disc 6 which is fixed by any suitable means to the external surface 4a of the flange 4. The right flange 5 forms a support for a toothed transmission gear 7 about which passes a chain (not shown). This toothed gear 7 is fixed on the external surface 5a of the flange 5, by any suitable means.

The central core 3 and the flanges 4 and 5 are respectively mounted for rotation by means of roller bearings 8, 9, 10, about the axis xy of the rear wheel.

When the hub is assembled, the flanges 4 and 5 are secured respectively to the front left surface 3a and the front right surface 3b, of the core 3, in positions indicated schematically by broken lines in FIG. 1. In these positions, the side flanges 4 and 5 are fixed in rotation with the central core 3 by the interfitting of complementary male and female coupling elements provided on the front surfaces 3a, 3b of the central core 3 and on the internal surfaces 4b, 5b, respectively, which is to say those which are turned toward the central core 3, of the flanges 4 and 5. The connection elements are constituted by projections 12 provided on one of the surfaces facing complementary recesses 11 provided in the other facing surface, distributed over circles of the same diameter.

In the example shown in FIGS. 1 and 2, each front surface 3a, 3b of the central core 3 has recesses 11 distributed regularly about the axis x, y of the central core 3. These recesses can be six in number as is shown in FIG. 2 being distributed 60° from each other. Moreover, each of the side flanges 4, 5 has, on its respective internal surface 4b, 5b, projections or lugs 12 distributed regularly about the axis x, y of the hub and disposed facing the recesses 11, seen in the axial direction. The right flange 5, which is secured to the toothed transmission gear 7 and which is subject to the tractive force, comprises a number of lugs 12 equal to that of the recesses 11 whilst the left flange 4 which carries the brake disc 6 and which is subject to a lesser force, can comprise a lesser number of lugs 12, for example only three lugs regularly spaced of 120° relative to each other. In addition, side flanges 4, 5 may have a projection 20 that fits over an outer periphery of central core 3, as seen in FIG. 1.

The hub according to the invention moreover comprises, on the exterior of each of the side flanges 4, 5, a crosspiece 13 of a width that varies as a function of the type of vehicle on which the hub is mounted, to take account of the different widths of the rear forks.

The hub which has been described facilitates reversing the tire of the rear wheel. Thus, after having taken off the wheel nut, the axle is extracted from the hub to free the wheel. Once the latter is disengaged from the fork, the two flanges 4, 5 which are received in the front surfaces of the central core 3 are dismounted from the central core 3.

The two flanges 4, 5 are remounted by reversing their positions. Stated another way, the flange 4 carrying the brake disc 6 is installed on what previously was the right side by inserting its lugs 12 into the recesses 11 of the front surface 3b of the central core 3 and the other flange 5 is installed what was previously the left side by inserting its lugs 12 into the recess 11 of the front surface 3a of the core 3. The wheel is then again mounted with the flanges 4, 5 in their reverse positions and because of this the wheel is then driven in rotation in the opposite direction from the preceding one and its tire thus better grips in traction because it works in the reverse direction of its previous wear.

In the modified embodiment shown in FIG. 3, the rear hub is of monobloc construction, symmetrical relative to the transverse medial plane P, constituted by the central cylindrical core 3' and by two annular gears 14 and 15 fixed respectively to the front surfaces 3'a, 3'b of the core 3', coaxially relative to the axis x, y of the core. The two gears 14, 15 have the same external diameter and they each assume a double function, namely, that of toothed drive gear, thanks to the provision of respective teeth 14a, 15a at their peripheries, and that of a disc brake by their external annular surfaces 14b, 15b. Thanks to this construction, the rear hub has, in each of its two possible mounting positions spaced apart by 180°, a toothed gear 14a, 15a on the side on which is located the drive chain and an annular brake disc 14b, 15b on the side of the disc brake.

What is claimed is:

1. A rear wheel of a two-wheeled vehicle comprising:
   a hub having an axis of rotation and movable about an axis transverse to said axis of rotation to first and second positions;
   a toothed gear on a first side of said hub for transmission of rotative movement; and
   a brake disc on a second side of said hub,
   wherein the hub comprises:
      a central core rotatable about said axis of rotation and having a plurality of connecting elements radially distributed about first and second core surfaces relative to said axis;
      a first flange having a first flange surface connected to said toothed gear and a second flange surface axially slidably connected to said central core, said second flange surface of said first flange having a plurality of coupling elements that slidably contact said plural connecting elements of said first core surface in said first position and that slidably contact said plural connecting elements of said second core surface in said second position; and
      a second flange having a first flange surface connected to said braking disc and a second flange surface axially slidably connected to said central core, said second flange surface of said second flange having a plurality of coupling elements that slidably contact said plural connecting elements of said second core surface in said first position and that slidably contact said plural connecting elements of said second core surface in said second position, so that said central core is fixedly engaged between said first and second flanges in rotation and said first and second flanges are freely axially movable with respect to said central core.

2. The rear wheel according to claim 1, further comprising a crosspiece having a width that is variable as a function of a type of vehicle and is connected to said first flange surfaces of said first and second flanges.

3. The rear wheel according to claim 1, wherein the plural connecting elements are recesses regularly distributed about said central core.

4. The rear wheel according to claim 3, wherein said plural coupling elements of said first and second flanges are projections or lugs regularly distributed about said second flange surfaces of said first and second flanges and are facing said plural recesses.

5. The rear wheel according to claim 1, wherein a number of plural coupling elements of said first flange is equal to a number of plural connecting elements and a number of plural coupling elements of said second flange is less than a number of plural connecting elements.

6. A rear wheel of a two-wheeled vehicle comprising:
   a hub that is axially symmetrical with respect to an axis of rotation; and
   first and second toothed gears on respective first and second sides of said hub for transmission of rotative movement,
   wherein an annular surface of said first and second toothed gears opposite said hub is a brake disc.

* * * * *